United States Patent
Dellmann et al.

(10) Patent No.: US 6,250,435 B1
(45) Date of Patent: Jun. 26, 2001

(54) ACTUATION DEVICE FOR MACHINE ELEMENTS HAVING WEAR-INDUCED PLAY

(75) Inventors: Torsten Dellmann, Köln; Axel Kemner, Isernhagen; Harald Neumann, Aachen; Arne Heymer, Köln, all of (DE)

(73) Assignee: Mannesmann AG, Düsseldorf (DE)

( * ) Notice: Subject to any disclaimer, the term of this patent is extended or adjusted under 35 U.S.C. 154(b) by 0 days.

(21) Appl. No.: 09/448,819

(22) Filed: Nov. 24, 1999

(30) Foreign Application Priority Data

Nov. 25, 1998 (DE) .............................. 198 55 280

(51) Int. Cl.[7] ............................................. F16D 55/02
(52) U.S. Cl. .................... 188/71.8; 188/203; 188/196 A; 91/173; 267/136
(58) Field of Search ................... 188/203, 71.7, 188/71.8, 196 C, 196 A, 196 R, 196 D, 197, 79.51, 79.57, 351, 153 R; 91/169, 173; 92/52; 267/136

(56) References Cited

U.S. PATENT DOCUMENTS

| | | | |
|---|---|---|---|
| 2,345,811 | 4/1944 | Harp | 188/152 |
| 4,005,767 * | 2/1977 | Farello | 188/203 |
| 4,088,205 * | 5/1978 | Frania et al. | 188/196 D |
| 4,385,548 * | 5/1983 | Persson et al. | 188/196 D |
| 4,467,605 * | 8/1984 | Smith | 188/196 A |
| 4,635,762 * | 1/1987 | Nilsson et al. | 188/203 |
| 4,802,559 * | 2/1989 | Fourie et al. | 188/196 A |

* cited by examiner

*Primary Examiner*—Robert J. Oberleitner
*Assistant Examiner*—Mariano Sy
(74) *Attorney, Agent, or Firm*—Cohen, Pontani, Lieberman & Pavane

(57) ABSTRACT

An actuation device for machine elements having wear-induced play, especially for brakes in rail vehicles, has an actuating piston-cylinder unit which generates actuation force and has a piston rod. The piston rod cooperates with a readjusting device which compensates for play caused by wear and which supplies the actuation force to the machine element to be actuated such that wear play is compensated. The readjusting device comprises a hydraulic piston-cylinder unit which carries out the wear play readjustment through the extension of an adjusting piston. To actuate the adjusting piston, a sensor element detects the wear-induced play and, when a threshold amount of wear-induced play is reached, opens a valve which admits a hydraulic medium to the readjusting piston-cylinder unit by utilizing the operating pressure of the actuating piston-cylinder.

11 Claims, 2 Drawing Sheets

ACTUATION DEVICE FOR MACHINE ELEMENTS HAVING WEAR-INDUCED PLAY

BACKGROUND OF THE INVENTION

1. Field of the Invention

The invention is directed to an actuation device for machine elements exhibiting wear-induced play, especially for brakes in rail vehicles, with a piston-cylinder unit which generates an actuation force and which has a piston rod which cooperates with a readjusting device which compensates for play caused by wear.

2. Description of the Related Art

In the present application, machine elements exhibiting wear-induced play are considered to be machine elements such as clutches or brakes. Machine elements of this type are used particularly for transmitting driving and braking forces in rail vehicles. To interrupt and close the flow of force, facings are used which withstand high thermal stresses on the one hand and enable a favorable progression of the force flow on the other hand. These facings are exposed to wear which causes a gradually increasing play. Readjusting devices are known for compensating this wear-induced play.

For example, a prior art actuation device is disclosed by European reference EP 0 174 690 having an adjusting nut/spindle assembly as a readjusting device for brakes. This prior art readjusting device is based on a control sleeve under a spring force. A first clutch operated by the spring force prevents an adjusting nut from rotating and causing a longitudinal adjustment of the piston spindle by a rotating movement. After traversing a predetermined play path, the first clutch is released by the displacement of the piston rod beyond a determined path, so that the adjustment of the play path can be increased corresponding to the wear that has occurred on the facing. Another forward feed movement of the piston results in the engagement of a second clutch, whereupon the adjustment of the adjusting nut on the spindle is stopped. This known complicated mechanism for engaging and disengaging the adjusting nut is costly to manufacture because of both a large number of parts and a long and intricate assembly procedure. The structural component parts, especially the clutch, which are highly stressed mechanically through friction have a strong tendency to wear.

Another prior art readjusting device is disclosed in German reference DE-OS 22 01 082, in which the above-mentioned type of readjusting mechanism is used for rail vehicle brakes in connection with a piston-cylinder unit for brake actuation.

SUMMARY OF THE INVENTION

It is an object of the present invention to provide a simple to operate, low-wear readjustment actuation device, especially for brakes in rail vehicles, for readjustment of play caused by wear.

This object is met according to the invention by an actuation device for operating a machine element exhibiting wear induced play, comprising an actuating piston-cylinder unit operative for generating an actuation force and having an actuating piston rod, a readjusting device comprising a hydraulic pressure space and a hydraulic readjusting piston-cylinder unit having an adjusting piston for communicating the actuation force of the actuating piston-cylinder unit to the machine element to be actuated, the adjusting piston being extendable for compensating for the wear-induced play, a sensor element operatively connected for detecting an amount of wear-induced play, and a valve element connected between the hydraulic pressure space and the readjusting piston-cylinder unit for admitting hydraulic medium into the readjusting piston-cylinder unit from the hydraulic pressure space via an operating pressure of the actuating piston-cylinder unit when the valve is open for extending said adjusting piston, the valve operatively connected to the sensor element for opening when the amount of wear-induced play exceeds a threshold limit.

The invention includes the technical teaching that for compensating for wear-induced play the readjusting device comprises of a hydraulic piston-cylinder unit which carries out the wear-induced play readjustment through the extension of an adjusting piston. To actuate the adjusting piston, a sensor element detects the wear-induced play. When a threshold wear-induced play is reached, the sensor element opens a valve which admits hydraulic fluid to the readjusting piston-cylinder unit by utilizing the operating pressure of the piston-cylinder unit which generates the actuation force, thereby extending the adjusting piston.

Accordingly, the compensation of wear-induced play is performed according to the invention by a series connection of two piston-cylinder units. The first piston-cylinder unit generates the actuation force—for example, for the brake—and the second piston-cylinder unit generates the readjusting movement which compensates for the wear-induced play. Aside from a minimal expenditure on structural component parts and a compact structural form, the advantage of this arrangement consists in that friction-induced wear of the actuation device itself is minimized. The piston-cylinder unit of the readjusting device is operated hydraulically to form a rigid, incompressible system by the fluid column which is enclosed in this way. However, the piston-cylinder unit generating actuation force may be operated hydraulically or pneumatically. In the specific case when the actuation device is used for brakes in rail vehicles, the piston-cylinder unit generating actuation force is operated pneumatically. The two piston-cylinder units are advantageously separated by a pressure medium converter. The pressure medium converter preferably comprises a dish-like housing with an open side closed by a diaphragm to form a hydraulic pressure chamber. The side of the diaphragm remote of the hydraulic pressure chamber adjoins a pneumatic pressure chamber of the piston-cylinder unit which generates an actuation force.

The sensor element which detects the wear play may be constructed in two preferred embodiment forms. First, the sensor element may be a mechanical stop which cooperates with the valve by way of an actuating tappet. Second, the sensor element may also be constructed as an electric pressure sensor which cooperates with an electromagnetic valve via an electronic unit.

The piston-cylinder unit generating actuation force is preferably constructed as a single-acting, spring-reset pressure medium cylinder. A spring which assists the readjustment is arranged inside of the hydraulic piston-cylinder unit.

To aid in space-saving for the arrangement, the pneumatic pressure chamber and the hydraulic pressure chamber are both arranged in the interior of a hollow piston of the piston-cylinder unit generating actuation force. The pneumatic pressure chamber communicates with a cylinder space of the piston-cylinder unit generating actuation force.

For resetting the readjusting device—for example, to restore brake facings—a manually actuated return-flow valve may be provided, so that the hydraulic fluid located in the cylinder space can be returned to the hydraulic pressure chamber.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters are used to denote similar element.

DETAILED DESCRIPTION OF THE PRESENTLY PREFERRED EMBODIMENTS

Figure 1:
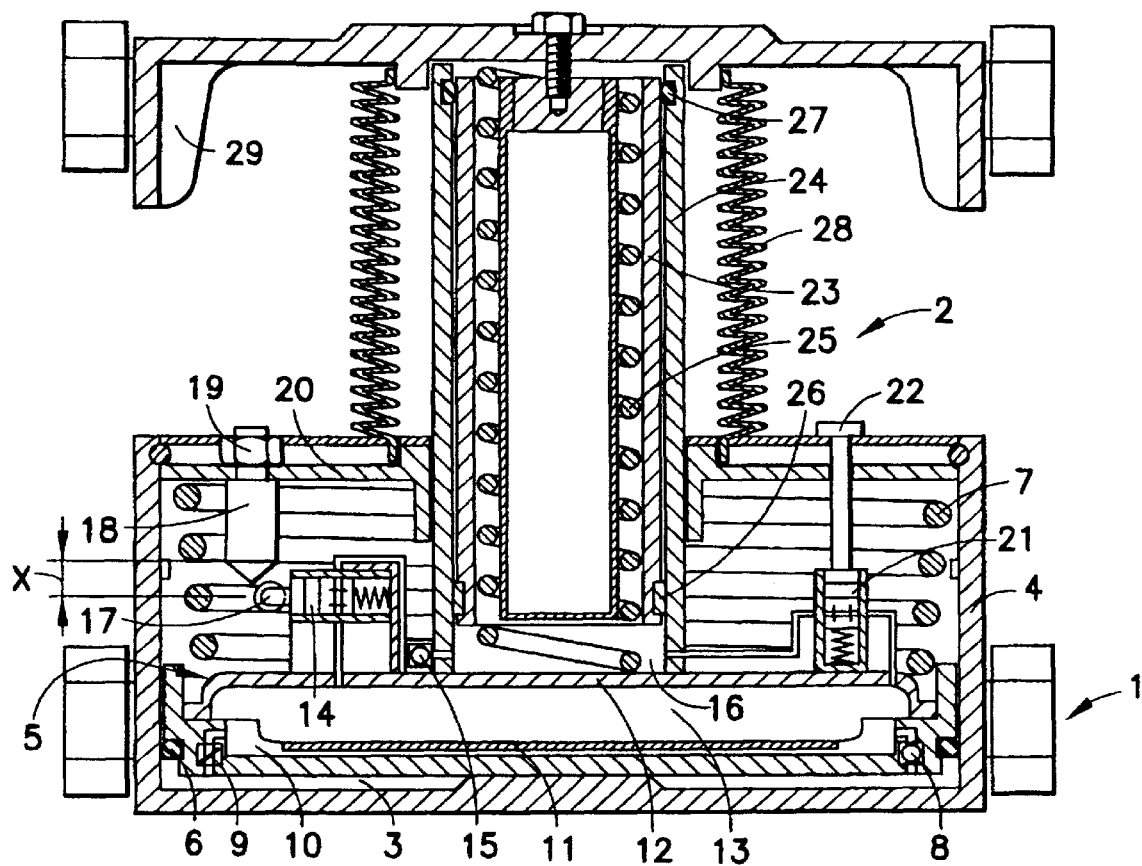
FIG. 1 is a longitudinal sectional view of an actuation device for brakes of rail vehicles according to a first embodiment of the present invention.

FIG. 1 shows an actuation device for brakes of rail vehicles which comprises a pneumatically operated piston-cylinder unit 1 generating an actuation force for actuating the brakes and a hydraulically operated piston-cylinder unit 2 which compensates for play caused by wear of the brake surfaces.

A cylinder space 3 of the piston-cylinder unit 1 is formed at the closed end of a pot-shaped housing 4 and closed by a hollow piston 5. When the brake is actuated, compressed air is admitted to the cylinder space 3 and the hollow piston 5 moves upward against the force of a spring 7. An outer radial seal 6 arranged between the hollow piston 5 and the housing 4 is fastened to the hollow piston 5 for sealing the cylinder space 3. The flow of compressed air continues via a check valve 8 and a throttle 9 from the cylinder space 3 into a pneumatic pressure chamber 10 located inside the hollow piston 5. The pneumatic pressure chamber 10 is defined by a diaphragm 11 serving as pressure medium converter. A hydraulic pressure chamber 13 containing hydraulic fluid formed jointly with a dish-like housing 12 is located on the other side of the diaphragm 11. The hydraulic fluid located in the hydraulic pressure chamber 13 can be returned to a cylinder space 16 of the hydraulic piston-cylinder unit 2 via a valve 14 followed by a check valve 15. The actuation of the valve 14 which is outfitted as a spring-reset 2/2-way directional control valve is operated by an actuation tappet 17. The actuation tappet 17 is operated by means of an adjustable mechanical stop 18. A screw connection 19 is provided for adjusting a position of the stop 18. The amount of permissible wear-induced play X is adjustable by this screw connection 19. The stop 18 is fastened in a cover 20 of the pot-shaped housing 4. A return flow of hydraulic fluid from the cylinder space 16 to the pressure chamber 13—for example, when changing the brake facings—may be manually initiated by a tappet 22 projecting out of the cover 20 of the pot-shaped housing 4 and connected to a valve 21. The piston-cylinder unit 2 must be moved in manually to cause the return flow. The piston-cylinder unit 2 includes an adjusting piston 23 inserted in a cylinder 24 proceeding from the hollow piston 5. An internal spring 25 arranged in the adjusting piston 23 reinforces the readjustment. The adjusting piston 23 is guided in the cylinder 24 via a sliding ring 26 and is sealed from the atmosphere by a seal 27. A bellows 28 prevents dirt from penetrating into the piston-cylinder unit 2 from the outside. A stop element 29 connected with the adjusting piston 23 forms the closure of the actuation device.

As stated above, the operation of the actuation device for brakes is triggered by the brake pressure. If brake pressure is present in the cylinder space 3, the pressure medium in cylinder space 3 immediately flows into the pressure chamber 10 via the check valve 8 and throttle 9 and exerts a force on the diaphragm 11. Since the valves 14 and 21 are blocked, the force is not initially conducted to the adjusting piston 23. The cylinder space 16 with its enclosed fluid column forms a rigid system. The applied pressure in the cylinder space 3 accordingly allows the hollow piston 5 with the cylinder 24 and the pressure plate 29 to move out, thereby actuating the brake. When the pressure in the cylinder space 3 is reduced, the spring 7 returns the hollow piston 5 to its starting position. Due to the wear at the brake disk and brake facing, the contact lift or travel of the hollow piston 5, cylinder 24, and pressure plate 29 to actuate the brake increases gradually until the distance X between the valve 14 and the stop 18 is exceeded. As a result, the valve 14 is actuated via the actuation tappet 17 forming a connection between the pressure chamber 13 and the cylinder space 16. Since the cylinder space 3 admits compressed air, a force is exerted on the hydraulic fluid in the pressure chamber 13 via the diaphragm 11. This force propagates via the valve 14 into the space 16 and allows the adjusting piston 23 with the pressure plate 29 to move out of the cylinder 24 up to the brake disk and then applies the full braking force. At the end of the braking process, the cylinder space 3 is deaerated. However, the pressure chamber 10 is deaerated only gradually via the throttle 9, so that the actuation force is temporarily maintained. In the meantime, the spring 7 pushes back the piston 5. However, since the valve 14 is still switched to open, the hydraulic fluid flows from the pressure chamber 13 into the pressure chamber 16. The adjusting piston 23 remains in its position because of the pressure force until the valve 14 closes again. This concludes the wear readjustment. The entire system subsequently moves back again.

If the wear play readjustment, i.e., the adjusting piston 23, is completely extended, it can be pushed back again manually. For this purpose, the valve 21 is actuated by hand via the tappet 22. This produces a connection between the cylinder space 16 and the pressure chamber 13. The adjusting piston 23 may now be pushed back. The hydraulic fluid flows back into the pressure chamber 13 again. The pressure chamber 13 is considered at the same time as a hydraulic fluid storage. Possible leaks can be compensated in this way.

Figure 2:
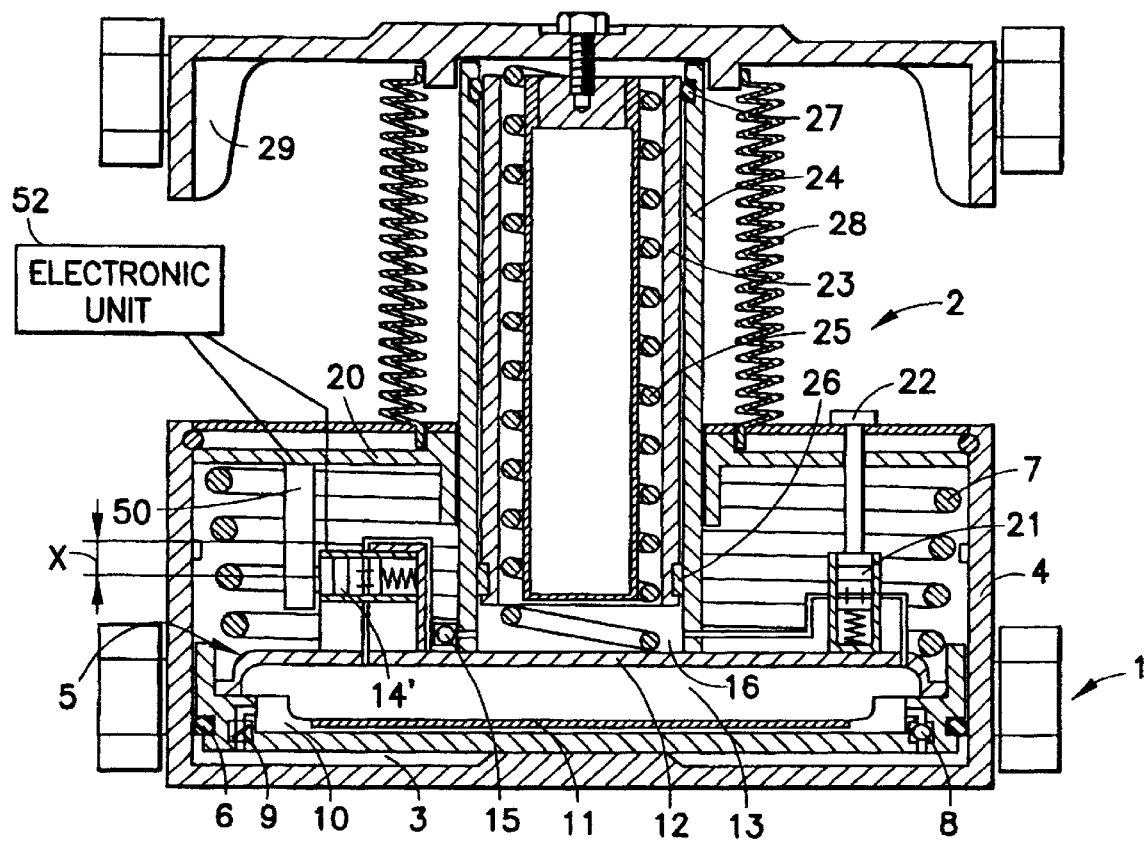
FIG. 2 is a longitudinal sectional view of an actuation device for brakes of rail vehicles according to a second embodiment of the present invention.

FIG. 2 shows an actuation device similar to the actuation device of FIG. 1. However, the actuation device of FIG. 2 has an electronic sensor 50 connected to an electronic unit 52. In this embodiment, an electromagnetic valve 14' is connected between the hydraulic pressure chamber 13 and the cylinder space 16. When the electronic sensor 50 senses that the wear-induced play is greater than a threshold value X, the electronic unit 52 actuates the eletromagnetic valve 14' so that hydraulic pressure medium is admitted to the pressure chamber 16 to compensate for the wear-induced play.

The actuation unit according to the invention is characterized by a compact construction and, owing to the concept of two piston-cylinder units which are connected one behind the other, has a minimal tendency toward wear and is constructed in a simple manner in comparison with conventional actuation units with a mechanical spindle readjustment.

The invention is not limited by the embodiments described above which are presented as examples only but can be modified in various ways within the scope of protection defined by the appended patent claims.

We claim:

1. An actuation device for operating a machine element exhibiting wear-induced play, comprising:

an actuating piston-cylinder unit operative for generating an actuation force and having an actuating piston rod;

a readjusting device comprising a hydraulic pressure space and a hydraulic readjusting piston-cylinder unit having an adjusting piston for communicating the actuation force in said actuating piston-cylinder unit to the machine element to be actuated, said adjusting piston being extendable for compensating for the wear-induced play;

a sensor element operatively connected for detecting an amount of wear-induced play; and a valve element connected between said hydraulic pressure space and said readjusting piston-cylinder unit for admitting hydraulic medium into said readjusting piston-cylinder unit from said hydraulic pressure space via an operating pressure of said actuating piston-cylinder unit when said valve element is open for extending said adjusting piston, said valve element operatively connected to said sensor element for opening when the amount of wear-induced play exceeds a threshold limit.

2. The actuation device of claim 1, wherein said valve comprises an actuating tappet and said sensor element comprises a mechanical stop which cooperates with said actuating tappet for opening said valve when the amount of wear-induced play exceeds the threshold limit.

3. The actuation device of claim 1, wherein said valve element comprises an electromagnetic valve and said sensor element comprises an electric pressure sensor which cooperates with said electromagnetic valve via an electronic unit.

4. The actuation device of claim 1, wherein said actuating piston cylinder unit comprises a pneumatic device operating via a pneumatic medium and said actuation device further comprising a pressure medium converter operatively connected between said actuating piston-cylinder unit and said readjusting piston-cylinder unit such that said actuating piston-cylinder unit communicates said actuating force to said readjusting piston-cylinder unit via said pressure medium converter.

5. The actuation device of claim 4, wherein said actuating piston-cylinder unit comprises a pneumatic pressure chamber and said pressure medium converter comprises a dish-like housing having an open side and a diaphragm closing said open side to form a hydraulic pressure chamber, wherein a side of said diaphragm remote from said hydraulic pressure chamber adjoins said pneumatic pressure chamber of the actuating piston-cylinder unit.

6. The actuation device of claim 1, wherein said actuating piston-cylinder unit comprises a reset spring.

7. The actuation device of claim 5, wherein said actuating piston-cylinder unit comprises a hollow piston and a cylinder space, said pneumatic pressure chamber and said hydraulic pressure chamber being arranged within said hollow piston and said pneumatic pressure chamber in pneumatic communication with said cylinder space of said actuating piston-cylinder unit.

8. The actuation device of claim 7, further comprising a throttle and a check valve connected between said cylinder space and said pneumatic pressure chamber, said check valve acting in the blocking direction with respect to said cylinder space.

9. The actuation device of claim 1, further comprising a check valve connected between said valve element and said readjusting piston-cylinder unit acting in a blocking direction with respect to said valve element.

10. The actuation device of claim 1, further comprising a spring operatively arranged in said readjusting piston-cylinder unit for assisting the extension of said adjusting piston.

11. The actuation device of claim 7, further comprising a return-flow valve operatively connected between said readjusting piston-cylinder unit for resetting the readjusting device in the open position by allowing said hydraulic medium in said cylinder space of said readjusting piston-cylinder unit to return to said hydraulic pressure chamber by said return-flow valve.

* * * * *